April 20, 1943.                J. C. TRAVILLA, JR., ET AL                2,317,156
                                  RAILWAY VEHICLE STRUCTURE
                          Filed March 17, 1941                2 Sheets-Sheet 2
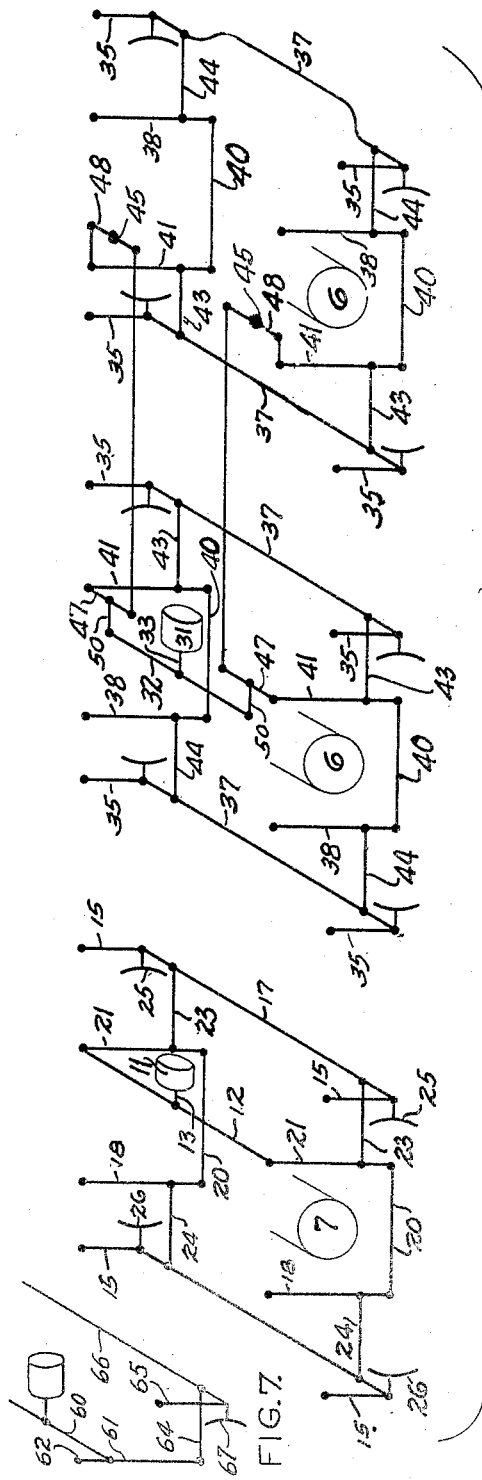
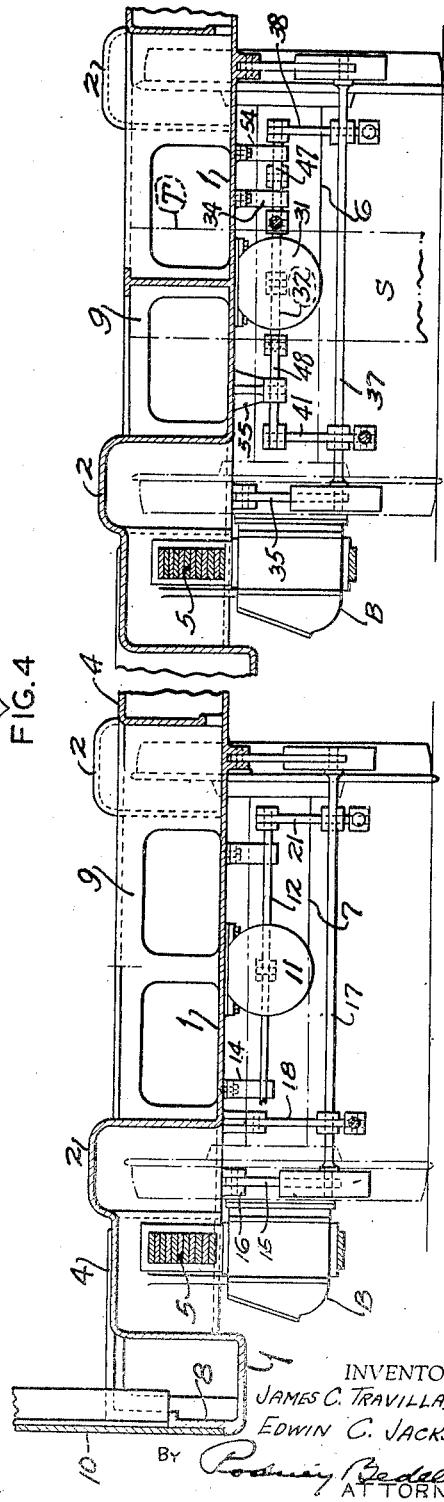
INVENTORS
JAMES C. TRAVILLA, JR.
EDWIN C. JACKSON
BY Rodney Bedell
ATTORNEY Patented Apr. 20, 1943

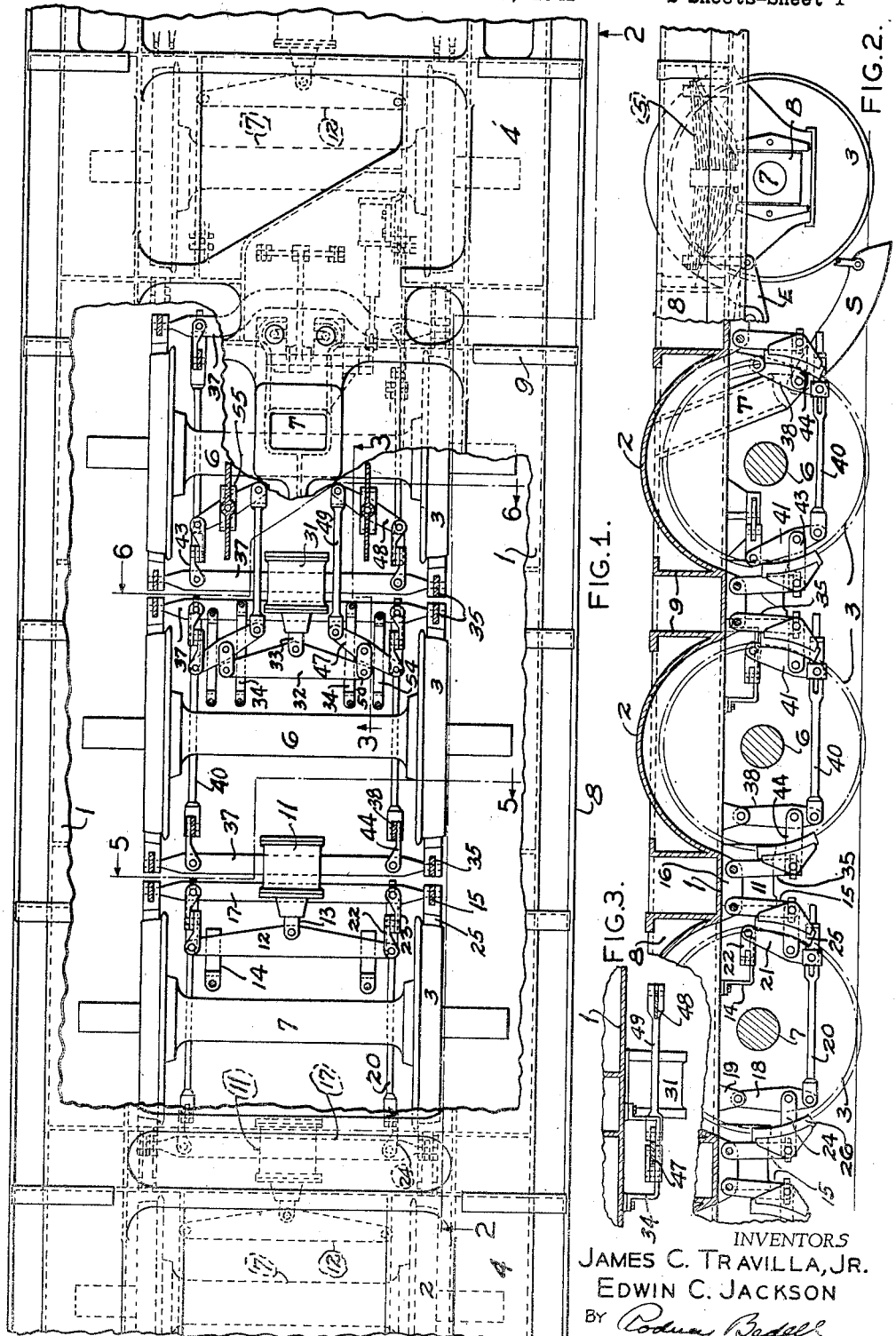

2,317,156

UNITED STATES PATENT OFFICE 2,317,156

RAILWAY VEHICLE STRUCTURE

James C. Travilla, Jr., Philadelphia, Pa., and Edwin C. Jackson, Clayton, Mo., assignors to General Steel Castings Corporation, Granite City, Ill., a corporation of Delaware Application March 17, 1941, Serial No. 383,672

6 Claims. (Cl. 188—56)

The invention relates to railway rolling stock, and more particularly to the mounting of the braking structure on a vehicle underframe and in the application of the brakes to running wheels.

The increased size, weight and capacity of railway vehicles and more particularly of railway tenders, for which the present invention is particularly adapted, necessitates increased braking facilities, and one of the objects of the present invention is to provide adequate brakes for a large capacity tender having the main load supporting wheels mounted on the tender underframe, and more particularly to adapt brake gear to this type of tender in which the underframe forms the bottom of the water tank of the tender and extends downwardly below the level of the tops of the wheels to increase the capacity.

Another object is to simplify the braking arrangement without detracting from its effectiveness.

Another object is to provide individual brake arrangement for each pair of wheels of a tender or other railway vehicle in which the supporting wheels are mounted on the underframe instead of separate trucks as heretofore used. A further object is to provide such a brake arrangement with a brake shoe for the wheel tread on each side of the wheel.

Another object is to connect the brakes for the wheels of a pair of adjacent axles journalled in the underframe, mounting the brake gear on the underframe, where it is not convenient to have each set of brakes equipped with a separate operating cylinder as is used in the preferred arrangement.

These and other detail objects are attained by the structures illustrated in the accompanying drawings, in which—

Figure 1 is a top view of the major portion of a locomotive tender underframe of the water bottom type mounted upon a series of axles and wheels journalled in the underframe, a portion of the underframe being broken away to better illustrate the running gear and brake arrangements beneath the underframe. It will be understood that either or both ends of the underframe may be supported by a swivel truck in the usual manner.

Figure 2 is a vertical longitudinal section and side elevation taken on the line 2—2 of Figure 1.

Figure 3 is a detail longitudinal vertical section taken on the line 3—3 of Figure 1.

Figure 4 is a diagram indicating isometrically the layout of the brake rigging for the wheels of the axles journalled in the underframe and illustrated in Figures 1 and 2.

Figures 5 and 6 are vertical transverse sections taken on the corresponding section lines of Figure 1.

Figure 7 is a diagram indicating a modified arrangement of the brake structure.

Preferably the water bottom underframe comprises a one-piece casting including a horizontal web 1 extending generally from end to end and from side to side of the vehicle and having portions recessed upwardly as at 2 to accommodate the wheels 3 journalled in the underframe and portions recessed upwardly as at 4 to accommodate the springs 5 carried on the journal boxes B mounted on axles 6 and 7 and supporting the underframe by equalizers E pivoted to the underframe intermediate adjacent wheels.

The side portions of web 1 and upstanding ribs 8 thereon form side sills, and transverse upstanding webs 9 extend from side to side of the underframe for reinforcing the horizontal web and cooperating therewith to transmit loads to the tender side girder structure, indicated at 10, of which side sills 8 form the lower chord. The general arrangement of the underframe and running gear structure is described and claimed in copending application, Serial No. 191,674, filed February 21, 1938, Patent No. 2,274,757, March 3, 1942, of which the present application is a continuation in part.

An individual brake cylinder 11 is provided for the wheels on each axle 7 and this cylinder is bolted or otherwise secured directly to a pad provided therefor on the bottom of web 1. An equalizing lever 12 is pivotally connected at its center to the piston rod 13 of each cylinder 11 and extends transversely of the car over brackets 14 which support the lever. Brake hangers 15 are suspended from lugs 16 depending from underframe web 1 and each pair of hangers 15 supports a corresponding brake beam 17 extending transversely of the truck.

Dead levers 18 are suspended from lugs 19 on the lower face of web 1, and closer to the longitudinal center line of the structure than brake hangers 15, and at their lower ends are connected by rod 20 to the lower ends of live levers 21 each of which has a clevis connection 22 at its upper end to the corresponding end portion of one of the levers 12. Between their ends live levers 21 have a similar link 23 to the adjacent brake beam 17. Similar links 24 connect dead levers 18 with the adjacent brake beam.

Upon the admission of air to any one of the cylinders 11, its equalizer lever 12 and the upper ends of live levers 21 are thrust towards the corresponding axle. Upon the contact of the adjacent brake shoes 25 with the wheel, the continued forward movement of the upper ends of levers 21 results in the movement of rods 20 and the lower portion of dead levers 18 in the opposite direction, bringing the brake shoes 26 at the other side of the wheel into contact with the wheel.

The structure illustrated and described provides a simple braking mechanism free of long pull rods and a plurality of levers for equalizing the brake pull between successive pairs of wheels. The use of the wheels journalled in the underframe eliminates the necessity of truck and body bolsters and makes possible the mounting of brake cylinders directly upon the underframe.

The arrangement provides clasp brakes for each wheel, but it will be understood the brakes could be applied to one side only of each wheel, if so desired, as indicated diagrammatically in Figure 7, in which the equalizing lever 60 is connected directly to and is carried by dead levers 61 suspended at 62 from the underframe and connected by links 64 to brake beam 66 which carries the braking element 67 and is supported by hanger 65 also suspended from the underframe.

If it is not feasible to provide an individual brake system for each axle as described above, some of the desirable features of the construction may be retained in an arrangement connecting the brakes of two adjacent axles, such as 6, where a single cylinder 31 is used to actuate the four brake beams 37 because of the presence of the water trough T and its scoop S depending from the middle portion of the underframe at a point which would interfere with the mounting of a brake cylinder and equalizing lever corresponding to that shown at 11 and 12 respectively.

Cylinder 31 is secured to the bottom of the underframe, as are cylinders 11, and its piston 33 is connected to an equalizing lever 32, corresponding to one of the levers 12, supported upon brackets 34 secured to the bottom of the underframe. Hangers 35 carry brake beams 37 and correspond to hangers 15.

Dead levers 38 are suspended from the underframe near the opposite ends of the two-axle brake unit and each is connected at its lower end by a rod 40 to the lower end of a corresponding intermediate floating lever 41, the upper end of which is connected to the end of a cross lever, those for the levers of the left hand axle being indicated at 47 and those for the levers of the right hand axle being indicated at 48. Levers 47 are supported by brackets 34 and 54. The other ends of cross levers 47 and 48 are connected by a rod 49.

The intermediate portions of levers 47 are connected to equalizer 32 by links 50. The intermediate portions of levers 48 are fulcrummed to the underframe by their supports 55. Links 43 and 44 connect live levers 41 and dead levers 38 to adjacent brake beams 37.

Upon admission of air under pressure to cylinder 31, the thrust of its piston will be transmitted equally to all four brake beams 37 through a series of levers supported from the underframe. The right hand brake beam 37 is shown offset intermediate its ends to clear scoop S, but this is an unimportant detail so far as the brake mounting and operation is concerned.

The construction of the swivelling truck which may support an end portion of the tender underframe is not illustrated or described in this application as it may be of any ordinary construction and will be provided with its own brake gear as is customary in such trucks. Such trucks are illustrated in the above-mentioned application, Serial No. 191,674, of which the present application is a continuation in part.

Other variations of the details may be made without departing from the spirit of the invention, and the exclusive use of such modifications as come within the scope of the claims is contemplated.

What is claimed is:

1. In a railway vehicle, a frame having a series of adjacent rigid axle receiving openings, wheel and axle assemblies journalled in said openings, brake rigging for each assembly comprising hangers supporting brake heads and beams at opposite sides thereof, power means mounted on said frame at one side of the assembly, live truck levers fulcrumed intermediate their ends from the beam at the side of said assembly where said power means is positioned, dead truck levers supported from said frame and fulcrumed from the other of said beams, pull rods connecting the lower ends of the live and dead levers at opposite ends of the assembly, and a cylinder equalizer connected at its mid-point to said power means and at its opposite ends to said live truck levers.

2. In a railway vehicle, a rigid frame having a series of adjacent axle receiving openings, a plurality of non-swivelling wheel and axle assemblies journalled in said openings, brake means for each assembly comprising brake beams supported at opposite sides thereof, brake heads on the ends of said beams, a plurality of fulcrums on each of said beams at intermediate points, live truck levers connected to the fulcrums of the beam at one side of the assembly, dead truck levers hung from said frame and connected to the fulcrums of the other said beams, pull rods connecting the live and dead levers at respective ends of said assembly below the level of said beams, power means on said frame at the side of said assembly adjacent said live truck levers, and an equalizing lever connected at its mid-point to said power means, and at its opposite ends to said live truck levers respectively.

3. In a railway vehicle, a frame having a plurality of rigid pedestals defining wheel openings, non-swivelling wheel and axle assemblies journalled in said openings, braking means for each assembly comprising hangers supporting brake heads and brake beams at opposite sides thereof, said hangers being pivotally connected at their upper ends to said frame and at their lower ends to the trunnion ends of said beams, fulcrums on each of said beams at spaced intermediate points, dead truck levers fulcrumed at their upper ends from said frame at one side of said assembly and connected at intermediate points to the fulcrums of the adjacent beam, live truck levers connected at intermediate points to the fulcrums of the beam at the opposite side of said assembly, pull rods connecting the live and dead truck levers at respective ends of said assembly below the level of said beams, power means mounted on said frame at the live truck lever side of said assembly, and an equalizer connected at its mid-point to said power means and at its opposite ends to said live truck levers.

4. In a railway vehicle, a rigid frame having a series of adjacent wheel openings, non-swivelling wheel and axle assemblies journalled in said openings, brake rigging for each assembly comprising hangers suspended from said frame and supporting brake heads and brake beams at opposite sides thereof, each of said beams having a plurality of fulcrums at spaced intermediate points, dead truck levers hung from said frame and connected to the fulcrums of the adjacent beam at one side of said assembly, live truck levers connected intermediate their ends to the fulcrums of the beam at the opposite side of said assembly, pull rods connecting the lower ends of the live and dead truck levers at respective ends of the assembly, operating means for said live truck levers comprising a cylinder supported on said frame adjacent said live truck levers, and an equalizer connected at its mid-point to the piston of said cylinder and at its opposite ends to said live truck levers respectively.

5. In a railway vehicle, a frame having a series of adjacent rigid axle-receiving openings, wheel and axle assemblies journalled in said openings, an individual brake rigging for each assembly comprising brake beams at opposite sides of the assembly, brake heads on said beams, hangers supporting said brake heads from the frame, live levers fulcrumed intermediate their ends from a beam at one side of the assembly, dead levers supported from the frame and fulcrumed from the other beam of each assembly, and pull rods connecting the lower ends of the live and dead levers at opposite sides of each assembly, said brake riggings being operated by power means, said means including at least one air cylinder mounted on the frame adjacent to the live levers of one of the brake riggings, and an equalizing lever conneced at its midpoint to the cylinder and connected at its ends at at least said last-mentioned live levers.

6. In a railway vehicle, a frame having a series of adjacent rigid axle-receiving openings, wheel and axle assemblies journalled in said openings, an individual brake rigging for each assembly comprising brake beams at opposite sides of the assembly, brake heads on said beams, hangers supporting said brake heads from the frame, live levers fulcrumed intermediate their ends from a beam at one side of the assembly, dead levers supported from the frame and fulcrumed from the other beam of each assembly, and pull rods connecting the lower ends of the live and dead levers at opposite sides of each assembly, said brake riggings being operated by power means, said means including at least one air cylinder mounted on the frame at one side of the assemblies, and an equalizing lever connected at its midpoint to the cylinder and connected at its ends to the live levers of at least two of said brake riggings.

JAMES C. TRAVILLA, Jr.
EDWIN C. JACKSON.